Patented Mar. 17, 1953

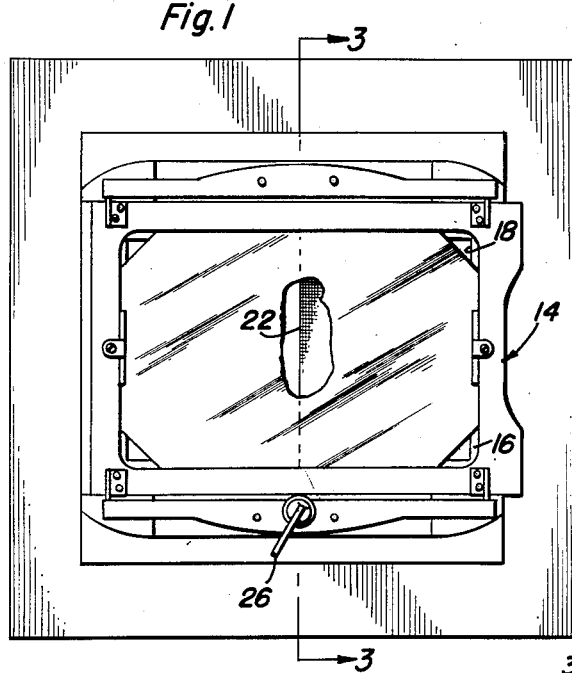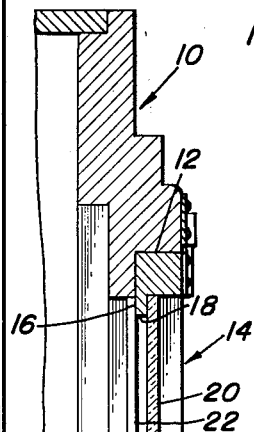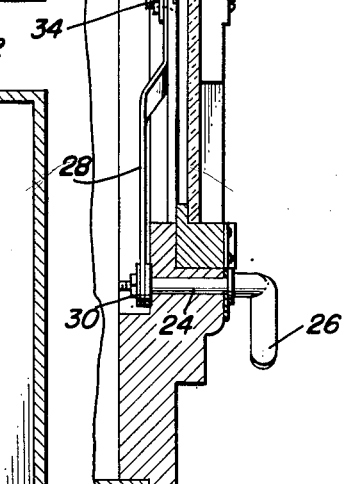

2,631,510

UNITED STATES PATENT OFFICE 2,631,510

TWIN EXPOSURE DEVICE FOR CAMERAS

John J. Stanks, Des Plaines, Ill.

Application September 28, 1951, Serial No. 248,707

1 Claim. (Cl. 95—36)

This invention relates to new and useful improvements and structural refinements in photographic cameras, and the principal object of the invention is to provide a device of the character herein described, whereby twin exposures may be taken on one sensitized film or plate, as the case may be.

An important feature of the invention resides in the provision of means for actuating the device from the exterior of the camera, whereby the sensitized film or plate need not be disturbed while the area of the exposure is shifted from one side to the other.

Some of the advantages of the invention lie in its simplicity of construction, in its efficient and dependable operation, and in its adaptability for use on cameras of different sizes and types.

With the above more important objects and features in view and such other objects and features as may become apparent as this specification proceeds, the invention consists essentially of the arrangement and construction of parts as illustrated in the accompanying drawings, in which:

Figure 1 is a rear elevational view of the usual back member of a conventional camera, the same being partially broken away so as to illustrate the invention embodied therein;

Figure 2 is a front elevational view, partly in section, of the device shown in Figure 1, and Figure 3 is a sectional view taken substantially in the plane of the line 3—3 of Figure 1.

Like characters of reference are employed to designate like parts in the specification and throughout the several views.

Referring now to the accompanying drawings in detail, the general reference character 10 designates the usual back member of a conventional camera, the same being provided with a rectangular recess 12 for the reception of a removable plate holder unit 14, the plate holder having a rectangular frame 16 which defines an opening 18 for exposure of a sensitized plate or film 20 carried by the holder.

The instant invention resides in the provision of what may be called a twin exposure device comprising a shutter panel 22 which slidably engages the frame 16 and is of such size as to cover substantially a half of the opening 18, whereby the panel 22 may be shifted or slid transversely from one side of the frame to the other, to expose one or the other half of the sensitized plate 20.

It will be apparent from the foregoing that in this manner two exposures may be taken on the same plate or film, and means are provided for shifting the panel 22, these means comprising an actuating shaft 24 which is rotatably journaled in the back member 10 centrally below the plate holder 14 and has an externally manipulable finger piece 26. A resilient lever 28 is secured at one end thereof by suitable means 30 to the inner end of the shaft 24, the other end portion of the lever 28 being provided with a slot 32 to slidably receive a projecting stud 34 carried by the panel 22. Thus, the panel may be shifted from one side to the other by simply oscillating the finger piece 26, and it is to be noted that the resiliency of the lever 28 is such as to urge the panel 22 in sliding engagement with the frame 16, so that no guides or tracks are necessary for the sliding panel.

It is believed that the advantages and use of the invention will be readily understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In a photographic camera, the combination of a back member provided with an elongated rectangular recess having stepped edges defining a perimetric flange at the inner side of the recess and a perimetric shoulder at the outer side of said flange, a plate holder positioned in the outer side of said recess in abutment with said shoulder and defining an elongated rectangular opening for exposure of a plate, said opening being smaller than the inner side of said recess whereby inner marginal edge portions of the frame project beyond inner edges of said flange, a rectangular shutter panel slidable transversely in the inner side of said recess and having an area substantially equal to a half of said opening, marginal edge portions of said panel slidably engaging said inner marginal edge portions of said frame, a shaft rotatably journaled in said back member at right angles to the plane thereof and centrally under said recess, an externally manipulable finger piece provided at the outer end of said shaft, a resilient lever secured at one end thereof to the inner end of said shaft, said lever having an offset intermediate portion and a free end portion in resilient pressing engagement with the inner surface of said panel for urging the latter against said inner marginal edge portions of said frame, and means connecting the free end portion of said lever to a center portion of said panel.

JOHN J. STANKS.

REFERENCES CITED

The following references are of record in the file of this patent:

UNITED STATES PATENTS

| Number | Name | Date |
|---|---|---|
| 910,750 | Walker | Jan. 26, 1907 |
| 1,748,687 | Wade | Feb. 25, 1930 |
| 2,172,283 | Kirby | Sept. 5, 1939 |